United States Patent [19]

Brar et al.

[11] Patent Number: 4,837,923
[45] Date of Patent: Jun. 13, 1989

[54] SURFACE FINISHING FOR MAGNETIC TRANSDUCERS

[75] Inventors: Amarjit S. Brar, Edina; Jimmie E. Mims; Jagdish P. Sharma, both of Bloomington, all of Minn.

[73] Assignee: Magnetic Peripherals Inc., Minneapolis, Minn.

[21] Appl. No.: 187,968

[22] Filed: Apr. 29, 1988

[51] Int. Cl.$^4$ .................................................. G11B 5/42
[52] U.S. Cl. ...................................... 29/603; 51/318; 51/326
[58] Field of Search .................. 29/603; 360/125, 127; 51/326, 327, 318, 281 R

[56] References Cited

U.S. PATENT DOCUMENTS

| | | |
|---|---|---|
| 3,229,355 | 1/1966 | Hluszko . |
| 3,321,872 | 5/1967 | Lindstrom .................... 51/326 X |
| 3,485,608 | 12/1969 | Cecil . |
| 3,821,815 | 6/1974 | Abbott et al. . |
| 4,279,102 | 7/1981 | Hennenfent et al. . |
| 4,511,942 | 4/1985 | Valstyn . |
| 4,599,827 | 7/1986 | Goodwin . |
| 4,670,972 | 6/1987 | Sakakima . |

OTHER PUBLICATIONS

Namba et al., "Float Polishing of Mn–Zn Ferrites and Characteristics of Finished Surfaces" Dept. of Precision Engineering, Tokyo pp. 1017–1022 1980.

Namba et al., "Ultrafine Finishing of Ceramics and Metals by Float Polishing", Dept. of Precision Engineering, pp. 171–179.

*Primary Examiner*—Carl E. Hall
*Attorney, Agent, or Firm*—Edward P. Heller, III; Richard E. Billion; Frederick W. Niebuhr

[57] ABSTRACT

A process for fabricating magnetic transducing heads includes successive grinding, lapping and finishing steps. The ferrite cores of the transducing heads are rough cut with a silicone carbide grinding wheel, to an excess over desired final throat height equal to approximately one-half the nominal diameter of the grinding wheel grit. The core and supporting pads then are placed on a soft tin or lead rotating lapping plate for removing substantially all of the excess. Finally, the pads and cores are hand-finished on a stationary plate or soft tin, copper or lead. A diamond slurry used during lapping and final finishing, has a controlled alkaline pH in order to simultaneously chemically etch and polish the cores.

17 Claims, 2 Drawing Sheets

SURFACE FINISHING FOR MAGNETIC TRANSDUCERS

BACKGROUND OF THE INVENTION

This invention relates to the fabrication of magnetic data transducing heads, and particularly to treating the surfaces of such heads having magnetic ceramic cores.

The ongoing effort to increase data storage capacities of magnetic discs and other media is directed primarily to increasing the density at which data can be stored. Greater density leads to stricter tolerances for the fabrication of transducing heads, particularly with respect to critical dimensions such as flux gap width and throat height.

As to gap width, U.S. Pat. No. 4,279,102 (Hennenfent) discloses a method for manufacturing narrow track ferrite head cores. A grinding wheel, mounted with extreme care to virtually eliminate radial and axial run-out, is used to cut a series of slots or kerfs in a ferrite bar. The slots form narrow projections, one associated with each core. Each projection includes the flux gap and affords control over the gap width. A liquid coolant jet is provided at the point of grinding wheel cutting.

In U.S. Pat. No. 4,670,972 (Sakakima), a magnetic layer is either sputtered or evaporated onto glass or other non-magnetic substrate. A second substrate is bonded to the first, with the sputtered layer providing a magnetic gap. Magnetic material then is sputtered or evaporated onto the bonded substrates to a predetermined thickness. The magnetic layers then are lapped to expose an edge of gap filling layer between adjacent magnetic layers. Grinding, lapping and polishing, particularly with reference to present-day magnetic ceramic materials, is not discussed in any detail. Since the gap filling layer is formed by sputtering, magnetic gap length is said to be precisely determined. Further, the thickness of the magnetic layers determines the gap width.

Other techniques are known, although not specifically related to fabricating magnetic heads. For example, U.S. Pat. No. 3,485,608 (Olin) discloses a slurry for polishing silicon slices, as opposed to magnetic ceramic materials where permeability is a paramount concern. The slurry has a diamond grit, and is pH controlled in the range of from nine to twelve, so that chemical etching proceeds simultaneously with polishing.

Certain ferrite materials used in the fabrication of transducing heads, and particularly cores, are known as magnetic ceramics. Such materials, e.g. manganese zinc ferrite (MnZn) and nickel zinc ferrite (NiZn) are particularly well suited as the core material in composite heads or in the construction of monolithic heads, due to their relatively high magnetic permeability and low coercivity.

At the same time, these magnetic ceramics are subject to damage from abrading and other surface treating techniques. It has been found that MnZn and NiZn ferrites are subject to multiple crystal dislocations and plastic deformation due to diamond grit lapping processes, which reduce the permeability near the article surface and create a layer of residual compressive stresses, referred to as a deformed layer or "dead layer". A known approach to reduce the dead layer is a chemical or electro-chemical etching, for which is disclosed a tin lapping plate with concentric circular grooves, submerged in a fluid, principally water containing about five percent silicon dioxide ($SiO_2$) particles of about seventy Angstroms in diameter.

It has been found that the deformed layer not only degrades magnetic properties, but increases surface cracking due to residual compressive stresses in the deformed layer, causing tensile stresses in regions near the deformed layer. Micro surface hardness (hardness of the surface layer) becomes non-uniform due to the creation of soft spots when the crystalline layer is deformed. The magnetic ceramic surface becomes more sensitive to heat, and oxides are formed during grinding and lapping operations which further contribute to the deformed layer.

Therefore, it is an object of the present invention to provide a process for fabricating transducing heads in a manner to substantially reduce the thickness of the deformed layer in magnetic ceramic materials.

Another object is to provide a composite head with improved magnetic permeability and signal amplitude.

Another object of the invention is to reduce crystalline dislodging at the surface of composite and/or monolithic transducing heads, to reduce the friction and resultant wear at the interface between discs and heads.

Yet another object is to increase the useful life of magnetic data reading and recording systems by fabricating a slider with more uniform micro hardness.

SUMMARY OF THE INVENTION

To achieve these and other objects, there is provided a process for fabricating a magnetic transducing head formed by the bonding of two magnetic ceramic sections to form a rigid body that includes the magnetic ceramic sections and a non-magnetic flux gap between them. An individual core is cut from the body and glass bonded to the slider, after which material is removed from the core to form a predetermined linear dimension in a selected direction and in a portion of the core about the flux gap. The material removal includes the steps of:

grinding the core with a grinding wheel having a grit of a first nominal diameter, to form in the core a generally flat surface lying in a plane substantially normal to the designated direction, to form an excess of core material beyond the selected linear dimension a distance substantially equal to one-half of the first nominal diameter;

after grinding, lapping the core on a slowly moving metal lapping plate covered with a slurry containing a diamond grit of a second nominal diameter substantially less than the first nominal diameter and with a pH selected in accordance with the magnetic ceramic material to simultaneously etch and polish the core until substantially all of the excess of material is removed; and following lapping, hand-finishing the core on a metallic plate covered with a slurry containing a diamond grit of a third selected nominal diameter substantially less than the second diameter, and at said selected pH.

Preferably, grinding is accomplished with a silicon carbide grinding wheel rotated at about one hundred revolutions per second and the first nominal diameter is approximately two-thousandths of an inch, resulting in a selected excess of about one-thousandth of an inch. The metallic lapping plate is preferably either tin or lead, and can be rotated at about ten revolutions per minute. A weight of approximately twenty-five grams is used to urge the slider against the lapping plate. The second nominal diameter can be approximately 0.25 microns, with a selected pH of nine. The hand-finishing process is advantageously performed on a stationary tin or lead plate, using a diamond slurry or paste in which the nominal grit diameter again is approximately 0.25 microns.

For effective cooling during grinding, multiple water jets are employed along both sides of the wheel. The water jets are parallel to one another, each at an appropriate angle (e.g. about 60° to 70°) to the rotational axis of the grinding wheel. The jets supply water preferably at the rate of about one cubic foot per minute.

It has been found that when rough grinding is discontinued to leave an excess of approximately one-half the nominal diameter of the grinding wheel grit, such excess encompasses the deformed or dead layer caused by grinding. The lapping process removes substantially all of the deformed layer, but causes some crystalline deformation and produces a much thinner deformed layer. The final hand-finishing step significantly reduces the deformed layer caused by lapping, whereby the final deformed layer is extremely thin, on the order of a few Angstroms. Hand-finishing on a soft tin or lead plate rather than the conventional glass plate improves heat conduction. Further, an extremely small (about 0.1 micron in diameter) diamond slurry is used with a controlled alkaline pH to cause simultaneous etching and lapping.

In accordance with the present invention, the thickness of the deformed layer is substantially reduced to enhance the magnetic properties and signal amplitude resolution capabilities of the ferrite core. The process also ensures a more uniform hardness throughout the slider and core, and controls and reduces friction during sliding contact between the transducing head and disc.

IN THE DRAWINGS

For a further understanding of the above and other features and advantages, reference is made to the following detailed description and the drawings, in which.

DETAILED DESCRIPTION OF THE PREFERRED EMBODIMENT

Figure 1:
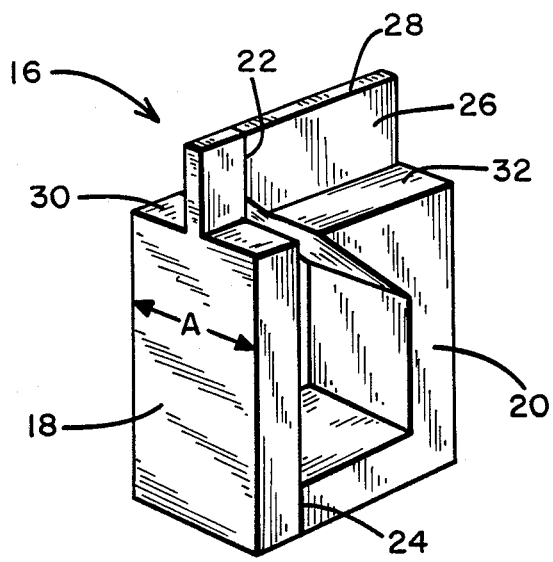
FIG. 1 is a perspective view of a ferrite core for a composite magnetic data transducing head.

Turning now to the drawings, there is shown in FIG. 1 a ferrite core 16 of a magnetic ceramic material such as MnZn ferrite and constructed in accordance with the process disclosed in U.S. Pat. No. 4,279,102 (Hennenfent). Briefly, a plurality of cores such as core 16 are formed by cutting ferrite bars into "I" and "C" sections, passivating the ferrite sections by reactive sputtering with $Al_2O_3$, then glass bonding the "I" and "C" sections together. After the formation of a series of kerfs or slots as described in the '102 Patent, the sections are cut transversely to form individual cores. Accordingly, core 16 has an I section 18 and C section 20, with the glass bonds forming upper and lower gaps 22 and 24, gap 22 being the flux gap of primary concern in determining the core transducing characteristics. As a result of the aforementioned slots, part of core 16 is formed as an upright projection 26 having a top surface or transducing face 28 having a width of about one-thousandth of an inch, as compared to the much larger (approximately five-thousandths of an inch) width of the main core, indicated at "A" in the figure. Projection 26 is preferably centered, thereby to form substantially horizontal lands 30 and 32 on opposite sides of the projection, each with a width of about two-thousandths of an inch.

Figure 2:
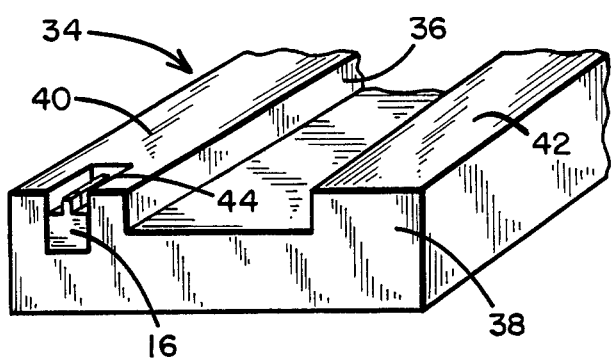
FIG. 2 illustrates the core in an intermediate stage of its mounting with respect to a ceramic pad of the transducing head.

In FIG. 2, core 16 is shown positioned for glass bonding to a slider or pad 34 preferably constructed of a pure ceramic material, e.g. calcium titanate ($CaTiO_3$). Pad 34 includes elongate rises 36 and 38 on its opposite sides, with respective surfaces 40 and 42 that together comprise the surface area of the pad nearest to a magnetic disc when reading or recording magnetic data. Once bonded, the core and pad together form a composite transducing head.

Figure 3:
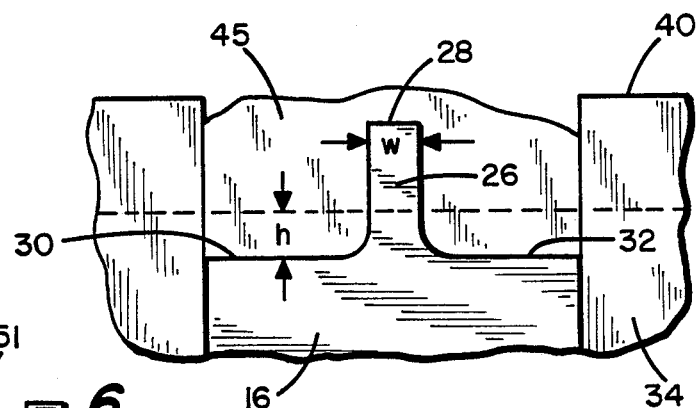
FIG. 3 is an enlarged view of a portion of FIG. 2 illustrating the core and pad at a subsequent stage of fabrication.

Prior to glass bonding, core 16 is positioned as shown in a cutout 44 formed in rise 36, with transducing face 28 lying in a plane substantially parallel to the plane of surfaces 40 and 42. The top of core 16 including projection 26 is totally covered with glass 45 (or another non-magnetizable bonding material) after bonding, as is shown in FIG. 3. In this figure, "w" designates the flux gap width, which is a critical dimension relating to head performance and permitted minimum distance between adjacent data tracks as explained in the '102 Patent. Another critical dimension, indicated at "h", is the throat height, namely the vertical distance between lands 30 and 32 and transducing face 28 of projection 26.

Figure 4:
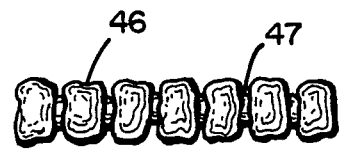
FIG. 4 is an enlarged view of a portion of FIG. 3 illustrating the crystalline structure of the core.

FIG. 4 is a schematic illustration of a portion of projection 26, enlarged to show the crystalline structure of the MnZn ferrite. Essentially, MnZn crystals 46 are bonded together by MnZn in an amorphous state as a binder between crystals, indicated at 47. Compared to crystals 46, the amorphous MnZn is not as hard and more subject to plastic flow when subjected to heat. In particular, binder 47 is subject to plastic flow which can disorient or dislodge the crystals, in effect "smearing" the outer layer of the crystalline structure to reduce its permeability and increase the chances of surface cracking.

In accordance with the present invention, the composite head is subjected to three controlled steps: namely grinding; lapping; and hand-finishing, for minimizing the deformed layer and thereby enhancing magnetic properties. The initial height of projection 26 must be at least 0.002 inches over the desired throat height "h".

The grinding step is described in connection with FIGS. 5 and 6. In connection with grinding as described below, it is to be recognized that while one core and pad could be treated individually, a preferred approach is to integrally mount several composite heads as shown for simultaneous grinding. Grinding or rough cutting is accomplished with a silicone carbide (SiC) grinding wheel 48 with a 320 grit, i.e. with particles having a nominal diameter of forty to fifty microns, or about two one-thousandths of an inch. Grinding wheel 48 is mounted to a metal, cup-like jig 49 horizontally disposed and supported on a vertical shaft 50, for rotation at a speed of about one hundred revolutions per second during grinding.

First and second pluralities of nozzles 52 and 54 are mounted respectively on opposite sides of the grinding wheel. The nozzles are supported on two manifolds 51, each of which receives coolant from a supply line 53. During grinding, each of nozzles 52 and 54 directs a jet of liquid coolant onto the head over the region encompassing the surface contact between wheel 48 and the head. As seen from FIG. 6, the nozzles provide jets of coolant at an angle of about 20° to 30° with respect to the plane of the grinding wheel, or about 60° to 70° with respect to the grinding wheel axis. The grinding wheel has a peripheral bevel of about 45°. It is apparent in FIG. 5 that nozzles 52 and 54 are oriented at an angle from the radii of wheel 48, so that the coolant jets travel in the direction of grinding wheel rotation. The transducing heads, each including pad 34 and core 16 glass bonded together, are integrally supported on a horizontally reciprocable table 56.

Nozzles 52 and 54 supply coolant at a rate sufficient for removal of all loose fragments, e.g. about one cubic foot per minute. The coolant is essentially water, with certain additives for minimizing clogging of the wheel such as chlorine, amines, nitrides or phosphites. The coolant supply rate, along with the above-described positioning of the coolant jets, enhances cooling of heads during grinding and minimizes the chances for clogging due to loose particles, whether grit from the wheel or fragments removed from the head being ground. The depth and severity of the deformed layer are reduced. Further, oxide formation is substantially eliminated, and residual stress and the chance for cracking are reduced. When ten composite heads are ground simultaneously as mentioned above, coolant supplied at a rate of about one cubic foot per minute has been found satisfactory.

Figure 5:
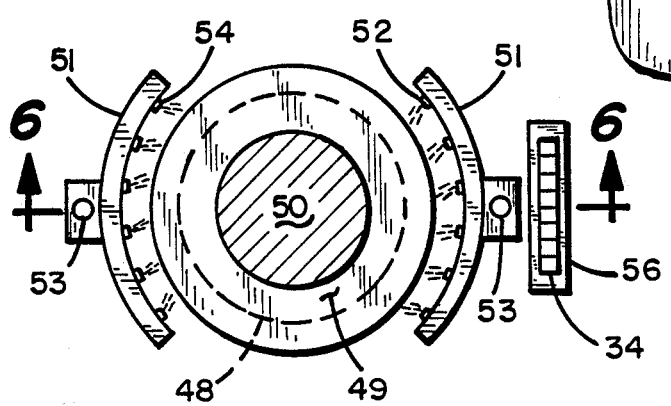
FIG. 5 is a plan view illustrating a grinding step of the fabrication process.
Figure 6:
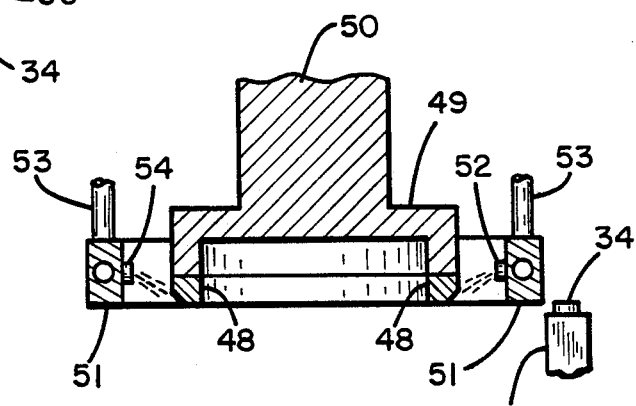
FIG. 6 is a sectional view taken along the line 6—6 in FIG. 5.

The grinding operation is performed in a series of passes or steps, each consisting of selectively vertically adjusting grinding wheel 48 and shaft 50, rotating them, then moving table 56 and the head rightwardly into the wheel as viewed in FIGS. 5 and 6 at a rate of about 3.5 feet per minute. Grinding wheel 48 is adjusted initially to remove about 0.002 inches of material. Then wheel 48 is stepped vertically downward, two-thousandths of an inch for each successive pass of the head, to remove material in 0.002 inch increments. While the initial passes remove only glass, grinding wheel 48 eventually removes the upper part of projection 26 as well. When sufficient material has been removed to leave an excess of about two-thousandths of an inch over the desired throat height "h", the grinding wheel is stepped downwardly only one-thousandth of an inch. A final pass thus leaves an excess over desired throat height of one-thousandth of an inch.

Figure 7:
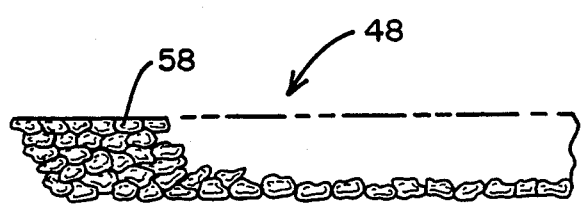
FIG. 7 is an enlarged view showing a portion of a grinding wheel.

The reasons for leaving an excess, and for selecting its thickness as one-thousandth of an inch, relate to the structure of grinding wheel 48, perhaps best seen in FIG. 7. The grit on the wheel consists of a series of particles 58 having a nominal diameter of forty to fifty microns, or approximately two-thousandths of an inch. Accordingly, the individual particles along the grinding wheel project from the surface as much as about half their nominal diameter, or about one-thousandth of an inch. Accordingly, the damage or deformed layer caused in core projection 26 by grinding wheel 48 has an expected maximum depth of one-thousandth of an inch. In short, the grinding process involves selectively leaving an excess over desired throat height, corresponding to half the nominal diameter of the grit employed in the grinding wheel.

Figure 8:
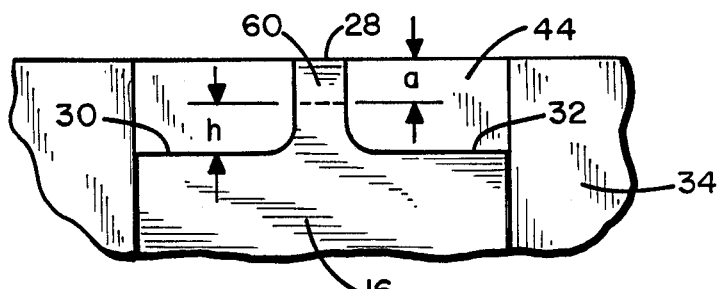
FIG. 8 is a view similar to that of FIG. 3, following the grinding step.

Grinding thus forms a planar surface normal to the vertical throat height. The result of the grinding process is shown in FIG. 8, with the depth of a deformed layer 60 indicated as "a", in this case equal to one-thousandth of an inch given the selected nominal size of the grit.

Figure 9:
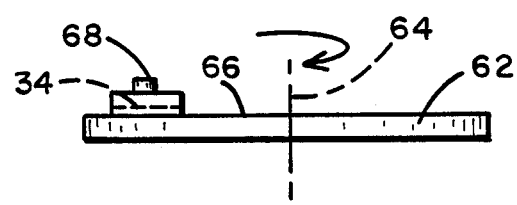
FIG. 9 is a schematic elevational view showing a lapping step of the fabrication process.
Figure 10:
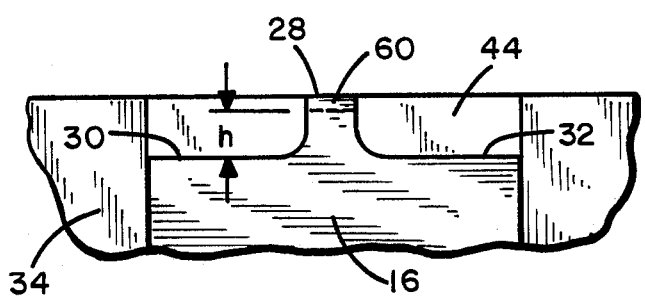
FIG. 10 is a view similar to that in FIGS. 3 and 8, taken after the lapping process.

FIG. 9 illustrates a lapping process performed after the grinding step. Lapping, along with a finishing step to be described, is performed on pad surfaces 40 and 42 as well as transducing face 28. A sixteen inch diameter lapping plate 62, preferably of soft tin or lead, is located about a vertical axis 64 at the rate of approximately ten revolutions per minute. The composite head is placed upon lapping plate 62 with surfaces 40 and face 28 downward, and maintained against a substantially planar and horizontal lapping surface 66 of the plate by a weight 68, preferably about twenty-three grams. In fact, the preferred lapping process involves treating multiple (e.g. ten) heads simultaneously, in which case a single weight of about two hundred and twenty-five grams is used with the heads during lapping. A lapping surface 66 is covered with a diamond slurry having a diamond grit with a nominal particle diameter of 0.25 microns. Further, the slurry has a controlled alkaline pH, preferably nine, so that etching occurs simultaneously with the polishing during the lapping operation. Compared to the grinding operation, material removal is quite slow, on the order of fifty micro inches for each rotation of lapping plate 62. Lapping is continued until substantially all of the one-thousandth of an inch excess is removed, as is shown in FIG. 10.

Figure 11:
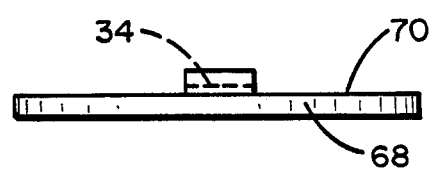
FIG. 11 is a schematic elevation of a hand-finishing step of the fabrication process.
Figure 12:
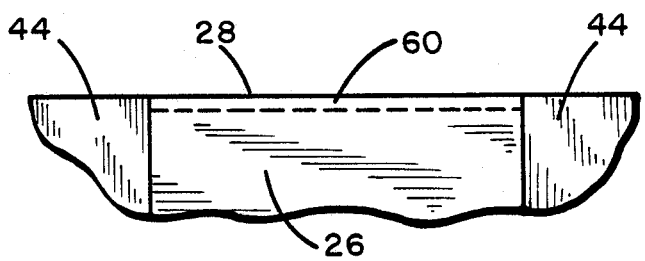
FIG. 12 is an enlarged view of a portion of the core and pad following the hand-finishing step.

While lapping removes most of deformed layer 60, part of the deformed layer remains and is believed to have a depth of about a few hundred Angstroms. Hence, a final step follows lapping, namely finishing the transducing head by hand on a stationary soft tin, lead or copper plate 68, as illustrated in FIG. 11. Again, while a single head is illustrated the actual hand-finishing preferably is accomplished with groups of ten such heads integrally mounted to a single base or plate. The hand-finishing proceeds for about twenty to thirty seconds, which substantially reduces deformed layer 60 to a depth believed to be a few Angstroms (FIG. 12). In addition to being softer than the conventional glass plate normally used in the final hand-finishing process, stationary plate 68 is a better heat conductor. This minimizes the retention of heat and accompanying damage to the crystalline structure of projection 26, and thus relieves stress built up in the dead layer. Tin and lead are preferred for softness, while copper is the best heat conductor. Further, a diamond slurry is provided as a coating over a finishing surface 70 of plate 68, with the aforementioned pH of nine and a diamond grit with particles of 0.25 micron nominal diameter.

Thus, in bonded cores and pads treated in accordance with the above grinding, lapping and finishing steps, the deformed layer is extremely thin. The build-up of compressive stress near the core surface is virtually eliminated, along with the corresponding undesirable reduction of magnetic permeability and increase in coercivity. The result is substantially improved signal amplitude and resolution in the transducing head. An added benefit of the process is uniform hardness over the core surface, which increases the useful life of the transducing head and recording medium, since it reduces the friction and accompanying wear at the transducer/medium interface. In addition to increasing overall hardness and uniformity of hardness, the virtual removal of compressive stresses similarly reduces the chances for surface cracking, chipping and fatigue failure.

What is claimed is:

1. A process for fabricating a magnetic transducing head formed by the bonding of two ferrite sections to form a rigid ferrite body including said sections and a non-magnetic flux gap between the sections, cutting an individual core from said ferrite body, bonding said core to a ceramic pad with a non-magnetizable binding material, and removing material from said core and pad to form in said core and flux gap a predetermined throat height measured in a selected direction, said material removal including the steps of:
    grinding said core and said binding material with a grinding tool having a grit of a first nominal diameter, to form in said core a generally flat surface lying in a plane substantially normal to said selected direction, until there remains an excess of said core over said predetermined throat height of approximately one-half of said first nominal diameter;
    following grinding, lapping said core on a slowly moving soft metal lapping plate covered with a slurry containing a diamond grit of a second nominal diameter substantially less than said first nominal diameter and with a selected alkaline pH, to simultaneously etch and polish said core until substantially all of said excess is removed; and
    following said lapping, hand-finishing said core on a stationary soft metallic plate covered with a slurry containing a diamond grit of a third nominal diameter substantially less than said first diameter, and at said selected pH.

2. The process of claim 1 wherein:
    said grinding step is performed with a silicone carbide grinding wheel rotated at high speed, and wherein said first nominal diameter is approximately two-thousandths of an inch, and wherein said selected excess is approximately one-thousandth of an inch.

3. The process of claim 2 wherein:
    material is removed from said core and said binding material in increments of approximately two-thousandths of an inch until a final increment of approximately one-thousandth of an inch is removed to provide said excess.

4. The process of claim 3 wherein:
    said grinding wheel is rotated at a speed of about six thousand revolutions per minute.

5. The process of claim 2 wherein:
    said metallic lapping plate consists essentially of at least one of the following constituents: tin and lead.

6. The process of claim 5 wherein:
    said lapping plate is rotated at approximately ten revolutions per minute.

7. The process of claim 5 wherein said second nominal diameter is approximately 0.25 microns, and said selected pH is nine.

8. The process of claim 5 wherein:
    said lapping step includes urging said core against said lapping plate under a weight averaging approximately twenty-five grams for each pad.

9. The process of claim 1 wherein:
    said third nominal diameter is approximately 0.25 microns.

10. The process of claim 3 wherein:
    said grinding step further includes providing a liquid coolant to the region of surface contact of said grinding wheel with said core and binding material.

11. The process of claim 10 wherein:
    said coolant is provided in the form of two sets of coolant jets, one set along each side of said grinding wheel.

12. The process if claim 11 wherein:
    said coolant jets are inclined at an angle of from 60° to 70° with respect to the axis of rotation of said wheel.

13. A process for controllably removing magnetic ceramic material from a magnetic ceramic workpiece to form in said workpiece a planar surface in a select plane and a predetermined dimension normal to said plane, including the steps of:
    grinding said workpiece with a grinding tool having a grit of a nominal diameter to form a generally flat surface parallel to said select plane and leaving in said workpiece an excess, over said predetermined final dimension, of approximately one-half of said first nominal diameter;
    following grinding, lapping said workpiece on a slowly moving lapping plate constructed of a lapping material consisting of either tin or lead, and having a lapping surface parallel to said select plane covered with a slurry containing a diamond grit of a second nominal diameter substantially less than the first nominal diameter and with a selected alkaline pH, to simultaneously etch and polish said workpiece until substantially all of said excess is removed; and
    following said lapping, hand-finishing said workpiece on a stationary plate constructed of either tin or lead and covered with a slurry containing a diamond grit of a third nominal diameter substantially less than said first diameter, and at said selected pH.

14. The process of claim 13 wherein:
    said grinding tool comprises a silicone carbide grinding wheel rotated at a speed of about one hundred revolutions per second, said first nominal diameter is approximately two-thousandths of an inch, and said selected excess is approximately one-thousandths of an inch.

15. The process of claim 14 wherein:
    said grinding step further comprises removing material from said workpiece in increments of approximately two-thousandths of an inch until a final increment of approximately one-thousandths of an inch is removed to provide said excess.

16. The process of claim 15 wherein said second nominal diameter is approximately 0.25 microns, and said selected pH is nine.

17. The process of claim 16 wherein:
    said third nominal diameter is approximately 0.25 microns.

* * * * *